United States Patent [19]

Gajewski et al.

[11] Patent Number: 5,147,485

[45] Date of Patent: Sep. 15, 1992

[54] LAMINATION OF SEMI-RIGID MATERIAL BETWEEN GLASS

[75] Inventors: Kenneth J. Gajewski, Woodhaven; John H. Meyer, Milford, both of Mich.

[73] Assignee: Ford Motor Company, Dearborn, Mich.

[21] Appl. No.: 604,689

[22] Filed: Oct. 29, 1990

[51] Int. Cl.⁵ .................. B32B 31/20; C03C 27/12
[52] U.S. Cl. ....................... 156/104; 156/286
[58] Field of Search ............ 156/286, 104, 99, 107; 264/519, 522

[56] References Cited

U.S. PATENT DOCUMENTS

| | | | |
|---|---|---|---|
| 1,921,612 | 8/1933 | Fraser et al. | 156/107 X |
| 1,980,510 | 11/1934 | Watkins | 156/107 X |
| 1,992,997 | 3/1935 | Drake | 156/107 |
| 3,234,062 | 2/1966 | Morris | 156/104 |
| 3,406,086 | 10/1968 | Foster . | |
| 3,769,133 | 10/1973 | Halberschmidt et al. | 156/104 X |
| 3,808,077 | 4/1974 | Rieser et al. . | |
| 3,933,552 | 1/1976 | Shumaker . | |
| 4,180,426 | 12/1979 | Oustin et al. | 156/286 X |
| 4,249,958 | 2/1981 | Baudin et al. | 156/107 X |
| 4,358,329 | 11/1982 | Masuda . | |
| 4,470,858 | 9/1984 | McMaster . | |
| 4,543,283 | 9/1985 | Curtze et al. . | |
| 4,642,255 | 2/1987 | Dlubak . | |
| 4,647,327 | 3/1987 | Rase . | |
| 4,683,172 | 7/1987 | LeGrand et al. . | |
| 4,744,844 | 5/1988 | Hurst . | |
| 4,771,167 | 9/1988 | Boulos et al. . | |
| 4,842,389 | 6/1989 | Wood et al. | 156/99 X |

FOREIGN PATENT DOCUMENTS

| | | | |
|---|---|---|---|
| 804589 | 2/1981 | U.S.S.R. | 156/104 |
| 963956 | 7/1964 | United Kingdom | 156/286 |

OTHER PUBLICATIONS

IBM Technical Disclosure Bulletin, vol. 15, No. 2, Jul. 1972 Packaging of Liquid-Crystal Displays by A. Aviram.

Primary Examiner—Michael W. Ball
Assistant Examiner—Adrienne C. Johnstone
Attorney, Agent, or Firm—Charles Ellerbrock; Peter Abolins

[57] ABSTRACT

A method is disclosed for producing superior optically clear laminates having a sheet of semi-rigid material encapsulated in a thermoplastic interlayer between layers of rigid material such as glass. Pre-cooled laminate elements are assembled at reduced temperature, allowing positioning of the sheet of semi-rigid material in the interlayer of the assembly with minimal wrinkling, formation of air bubbles or entrapment of moisture. Thereafter, the laminate assembly is maintained under vacuum for an extended period of time, substantially eliminating wrinkling, air bubbles and moisture from between the laminate elements as well as pre-forming the semi-rigid sheet. Bonding heat and pressure is then applied, first heating the assembly to "tack" the laminate elements together, and next applying heat and pressure for bonding the laminate elements. Superior optically clear laminates which result from the method are disclosed wherein a semi-rigid sheet of material is encapsulated in thermoplastic laminating material within an interlayer between sheets of rigid material such as glass.

16 Claims, 4 Drawing Sheets

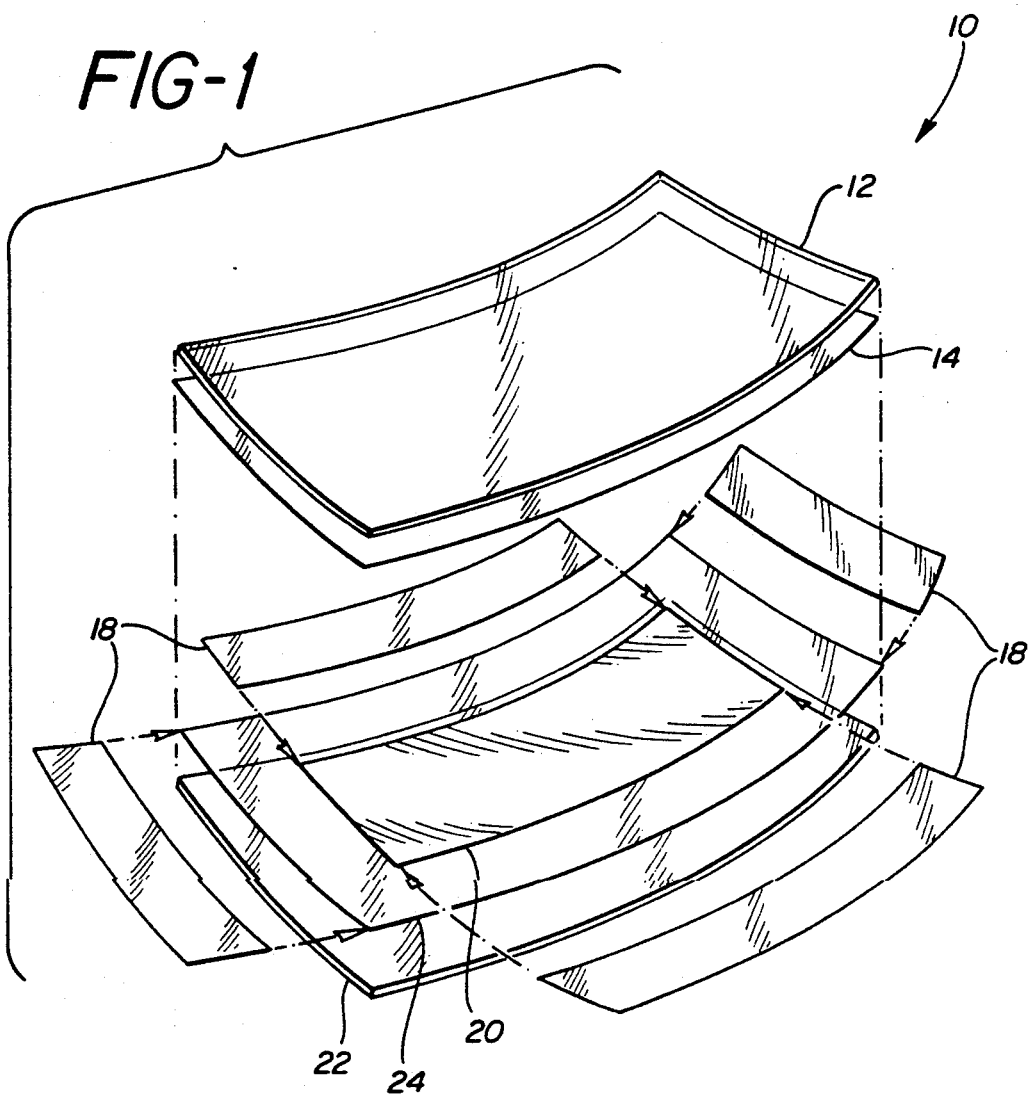
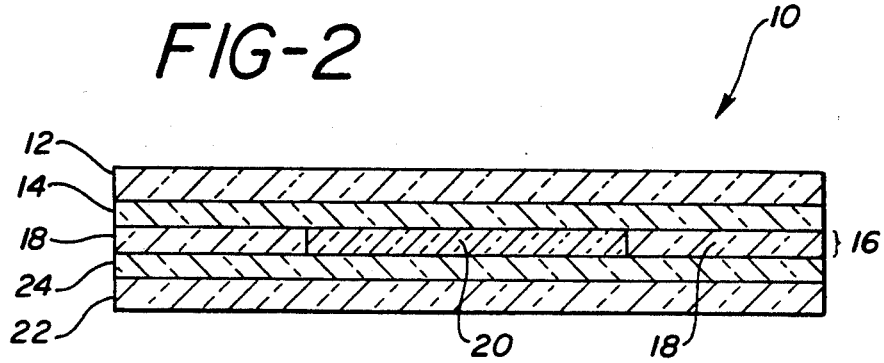

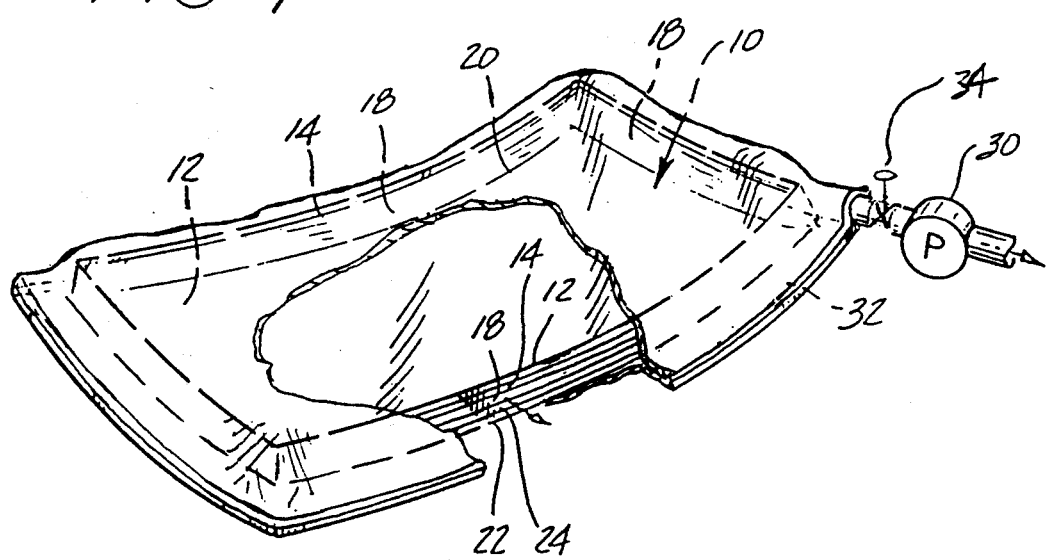

LAMINATION OF SEMI-RIGID MATERIAL BETWEEN GLASS

BACKGROUND OF THE INVENTION

The present invention relates to a method for producing laminated glass such as employed for automobile windshields and other commercial and industrial safety glass applications. In particular, the present invention relates to a method for producing a laminate comprising a sheet of semi-rigid material encapsulated in a thermoplastic interlayer between layers of rigid transparent materials, such as glass or glass substitutes. The present invention further relates to the superior laminate produced thereby.

Various methods are known in the art for producing laminates comprising flexible sheets of rigid transparent material, such as glass, polycarbonate, acrylic plastic, polyester and the like, having interlayers comprising sheets of material, such as polyvinyl butyral, polyurethane and the like. Typical of such methods are those disclosed by Foster, U.S. Pat. No. 3,406,086 at Cols. 5-7; Rieser et al, U.S. Pat. No. 3,808,077, at Cols. 17-18; Shumaker, U.S. Pat. No. 3,933,552; and those discussed by Masuda, U.S. Pat. No. 4,358,329, at Col. 1; and McMaster, U.S. Pat. No. 4,470,858, at Col. 1. Such bonding processes generally involve the application of heat and pressure, such as are available in oil autoclaves. Laminates have found wide application as safety glass due to their strength and preferable shattering characteristics compared to plain or tempered glass.

Among the problems related to the bonding of laminates has been the presence of moisture and air bubbles between laminate layers, and the wrinkling of flexible laminate layers, all of which optically distort the final product. In addition, prior art bonding methods employing oil autoclaves may introduce oil between laminate layers along the edges of the laminate. To eliminate air, moisture and oil, methods for laminating glass and thermoplastic sheet materials have been developed which further employ peripheral evacuation of the laminate assemblies. Such methods are shown by Rieser et al, Shumaker, Curtz et al, U.S. Pat. No. 4,543,283, Dlubak, U.S. Pat. No. 4,642,255 and Rase, U.S. Pat. No. 4,647,327 which variously use vacuum bags or peripheral vacuum chambers to achieve peripheral evacuation. Evacuation of such vacuum bags or peripheral vacuum chambers, serves to draw air and moisture from between the laminate layers, while the bags or chambers effectively create a barrier to oil penetration at the edges of those assemblies.

Nonetheless, the drawback of these bonding methods is that the application of heat and pressure required to bond the laminate layers is both cumbersome and expensive. To avoid this drawback while maintaining strength and other desirable characteristics, other bonding methods occurring at ambient temperatures have been developed in the prior art which involve the use of adhesive layers, such as disclosed by Masuda, LeGrand et al, U.S. Pat. No. 4,683,172, and McMaster. LeGrand et al further teach the use of a thin film of water containing surfactants as a means of preventing the formation of air bubbles between laminate layers. Nonetheless, both strength and optical clarity of laminates, particularly the entrapment of water and air between laminate layers, continue to be of concern in the production of laminates.

Also of general relevance to the present invention are methods for encapsulating liquids or solids within laminate structures. In particular, methods for encapsulating liquid crystal materials between laminates have been developed and are disclosed by IBM Technical Disclosure Bulletin, Vol. 15, No. 2, dated July 1972 and Ferrato, U.S. Pat. No. 4,418,102. In both of these references, an interlayer is comprised of a seal which completely surrounds the liquid crystal material, forming a sealed volume between laminate layers. In the IBM Disclosure, dielectric RF heating or ultrasonic energy is used to seal plastic layers such as polyvinyl chloride to create a volume which may thereafter be filled with liquid crystal material. The plastic layers forming the volume may further be sandwiched between glass plates. In the Ferrato patent, the seal between glass plates is comprised of a thermoset product of resins, requiring the application of heat, that forms a cavity which may be filled with liquid crystal material. Kruger et al, U.S. Pat. No. 4,469,408, and Ishii et al, U.S. Pat. No. 4,553,821 also show full peripheral frames or seals for encapsulating liquid crystal material in a laminate structure. Ishii et al employ heat and a heat sealing agent to seal the laminates and enclose a volume wherein liquid crystal material lies. Thus, in such applications, the liquid crystal material fills a volume between laminates and does not, itself, adhere to other laminate layers to provide structural support.

The problems of optical distortion in a laminate structure due to trapped air, moisture and wrinkling of interlayers becomes of even greater concern when dissimilar solid materials are joined to form an interlayer in a laminate structure. In the Dlubak patent, a method is disclosed for producing a laminated article having an interlayer comprising of fibrous layer encapsulated in a polyvinyl acetal, such as polyvinyl butyral. The interlayer is sandwiched between two glass outerlayers. The fibrous layer is placed well within the peripheral edge of the laminated article, presumably to avoid edge sealing problems, and is, for example, comprised of a woven lace cotton cloth. When placed between two glass outer layers and subjected to heat and pressure, the two sheets of polyvinyl butyral seal together to encapsulate the fibrous layer. At the same time, the assembly is placed in a vacuum bag having a partial vacuum to remove trapped air and moisture between the laminae. The vacuum, high temperature and pressure are maintained for a period of time during which the polyvinyl butyral is caused to flow through the interstices of the woven lace cloth, and no detectable air bubbles are reported to remain. However, because the Dlubak patent relates to a decorative article which is translucent, rather than transparent, optical imperfections, for example due to wrinkling of the fibrous layer, are not as critical as in applications where transparency is required, as with automobile windshields.

Thus, while the above references deal with encapsulating fluids and decorative articles, neither of which are designed to enhance the structural strength of the laminate, none address the encapsulation of semi-rigid sheet materials between laminates to form optically clear laminate structures. Further, while rigid interlayers are shown by Shumaker, the interlayer comprises an entire layer and is sandwiched between other layers, rather than being completely encapsulated.

Semi-rigid sheet materials are broadly defined as those which can be bent and flexed, but in so doing will tend to crease and fold. For purposes of illustration, such materials include, without limitation cardboard sheets; photography; or more pertinent to the present invention, certain plastic sheet materials such as polyester or Aclar TM available from Allied Chemical Company. As well, semi-rigid materials include composite sheet materials having semi-rigid properties, for example liquid crystal coatings sandwiched between sheets of polyester, or electroluminescent coatings on electrodes sandwiched between sheets of Aclar TM.

Further developments in windshield technology have involved the use of peripheral areas inward from the perimeter of the laminate for various materials, such as optically opaque coatings, and electrically conductive materials, for example as shown by Hurst, U.S. Pat. No. 4,744,844.

Thus, a need exists for an effective method of producing optically clear laminates, for example for use as windshields, glass roofs, moon roofs, side glass - any laminated glass part - wherein semi-rigid sheet materials are encapsulated within a laminate layer, but are located inward from the periphery, permitting other laminating materials to be used along peripheral edge areas. A need further exists for a method for encapsulating such materials and thereby provide additional strength to laminate.

SUMMARY OF THE INVENTION

This need is satisfied by the present invention in which a sheet of semi-rigid material is encapsulated as an interlayer of a transparent laminate. The method of the present invention eliminates air, moisture, wrinkles and creases from the laminate layers, and results in a strong, optically clear laminate structure. The method calls for the assembly of pre-cooled laminate elements at reduced temperatures to mask and eliminate wrinkling, creasing and formation of air bubbles or moisture between the laminae. Pre-cooled below ambient temperatures to a desired equilibrium temperature, the laminate elements are then assembled at such reduced temperatures. Of particular interest is the positioning of a sheet of semi-rigid material as an interlayer of the laminate assembly. In accordance with this method, the semi-rigid material is ultimately encapsulated in thermoplastic laminating material. Once assembled, the cooled laminate assembly is degassed by evacuation methods known in the art, such as vacuum bags or peripheral vacuum chambers connected to vacuum pumps. The cooled laminate assembly is maintained under vacuum for a period of time depending on its shape, size and configuration. The laminate assembly, maintained under vacuum, is then bonded into a laminate by the application of heat and pressure. It is preferred to first heat the laminate assembly for a period of time which still under vacuum, for example by placing it in a heated chamber, which permits the thermoplastic laminating material to melt and become sufficiently tacky to at least partially hold adjacent laminated layers together. Heat and pressure are next applied for a period of time, for example by placing the laminate assembly in an autoclave, preferably removing the laminate assembly from under vacuum, although it may still be maintained under vacuum. Other methods known in the art may be used to apply heat and pressure for this first step.

The pre-cooling of the laminate elements and assembly of those elements at lowered temperatures stiffens the laminate elements, preventing wrinkling and creasing during handling. Moreover, cooling of the laminate elements is believed to reduce the surface attraction and friction between elements, allowing them to slip and conform to their final shape without wrinkling, creasing or forming air bubbles as may occur in prior art methods.

The reduced friction between the elements is particularly beneficial when the elements are made to conform to curved laminate assemblies. The pre-cooling temperature is not so cold that the laminate elements become brittle, stiff or incapable of conforming to desired shapes. Rather, the pre-cooling temperature renders semi-rigid materials more amenable to lamination. Evacuation of the assembly further prevents the formation of air bubbles and removes moisture. It has been found that the longer the assembly is maintained in a vacuum, the better the result. This is of particular significance in encapsulating semi-rigid materials having liquid crystal coatings to obtain optically clear curved laminate assemblies.

The present invention further provides a superior safety laminate which is optically clear, free of moisture, air, wrinkles and creasing, and strengthened by an encapsulated sheet of semi-rigid material. The laminate assembly is comprised of a first rigid transparant layer, a first layer of thermoplastic laminating material, an interlayer comprising a sheet of semi-rigid material properly positioned and preferably surrounded on its periphery with spacers of thermoplastic laminating material, a second layer of thermoplastic material and a second rigid transparent layer. By virtue of assembling and degassing the laminate elements at lowered temperatures, trapped air, moisture, wrinkles and creasing are minimized, and the bonding process results in a laminate which exhibits both strength and high optical clarity. It may be appreciated by one skilled in the art that high quality translucent or opaque laminates, or those using optically clear qualities of only one of the rigid transparent layers may be produced by the method of the present invention.

It is therefore an object of the present invention to provide a method of assembling thermoplastic, semi-rigid, and rigid laminate at reduced temperatures to mask and eliminate wrinkling, creasing, or formation of air bubbles, whereby the semi-rigid material is encapsulated in the thermoplastic material. Another object of the present invention is to provide a laminate having both strength and superior optical clarity by virtue or encapsulating a transparent sheet of semi-rigid material in the interlayer without the formation of air bubbles, moisture, wrinkling or creasing.

It is a further object of the invention to include in the interlayer areas contiguous with the outer periphery of the semi-rigid material which areas may be used for other purposes, such as coatings, electrical connections, and the like which are compatible with the thermoplastic laminating material, while the overall laminate structure enjoys the added strength provided by the presence of the semi-rigid material therein.

BRIEF DESCRIPTION OF THE DRAWINGS

FIG. 1 is an exploded perspective view of the preferred embodiment of the laminate of the present invention.

FIG. 2 is a simplified cross-section of the laminate of the present invention.

FIG. 7 is a schematic perspective view of the assembled laminate in an alternative degassing arrangement.

DETAILED DESCRIPTION OF THE PREFERRED EMBODIMENT

Figure 3:
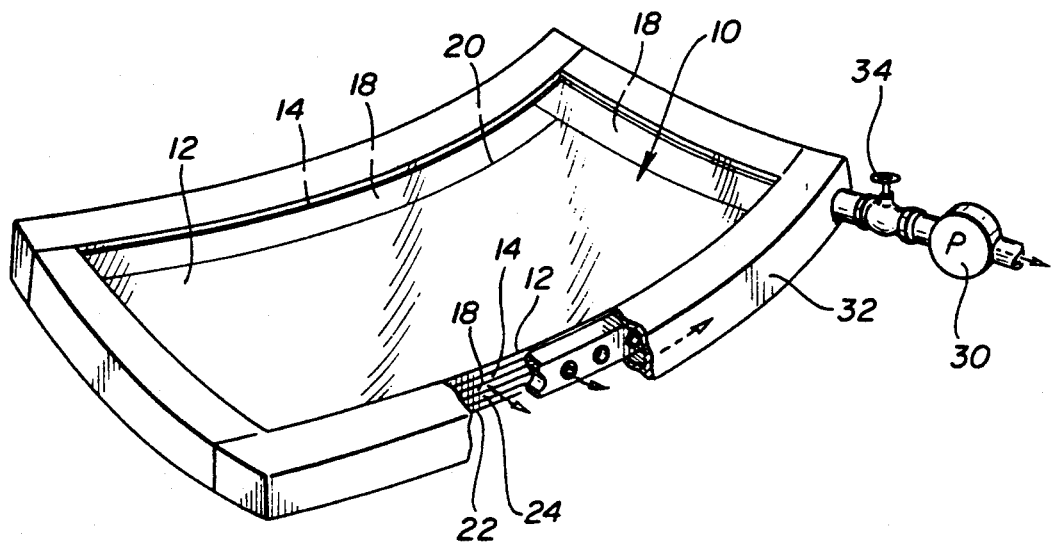
FIG. 3 is a schematic perspective view of the assembled laminate in a degassing arrangement.

According to the present invention, the elements of safety laminate 10 of the present invention, shown in FIG. 1 are cooled by conventional means from ambient temperature (generally 72° F.) to thermal equilibrium at a lower, cooler temperature. Whether in a cooled room, vault, box or the like, the laminate elements are then assembled while at the lower temperature. Further seen in FIG. 2, the laminate 10 is comprised of a first layer 12 of rigid transparent material, preferably glass or polycarbonate; a first layer 14 of thermoplastic laminating material, preferably a polyvinyl acetal; an interlayer 16, comprised of at least one sheet of semi-rigid material 20, preferably polyester, and preferably including one or more spacers 18 of the same thermoplastic laminating material as first layer 14, which spacers 18 surround at least part Of semi-rigid sheet 20; a second layer 24 of thermoplastic laminating material of the same composition as first layer 14; and a second layer 22 of rigid transparent material, preferably glass or polycarbonate.

It has been found advantageous to assemble the elements at lower, cooler temperatures. In this assembly process, the semi-rigid sheet 20 is positioned as desired within the laminate 10. In the preferred embodiment of FIG. 1, spacers 18 are added, preferably surrounding the entire periphery of semi-rigid sheet 20, as shown, encapsulating sheet 20 and preventing the possibility of trapping air along an edge of semi-rigid sheet 20. In this regard, spacers 18 may be thicker than semi-rigid sheet 20 to provide additional laminating material which can flow into gaps and voids during bonding. Spacer 18 may also be a one-piece skirt, fitted to surround semi-rigid sheet 20.

It has been found that pre-cooling to equilibrium and assembly of laminate elements at cooler temperatures stiffens the laminate elements, particularly layers 14 and 24, semi-rigid sheet 20 and spacers 18. It is further believed that pre-cooling reduces the surface attraction and friction between all the laminate elements. As a result, the laminate elements are allowed to slip, be positioned and conform to a final shape without wrinkling or creasing as occurs with laminate layers in the prior art methods. Further, the formation of air bubbles is also prevented. The cooler temperatures are below ambient (defined generally as 72° F.), and preferably below 50° F. However, the temperature is not so cold that the laminate elements become brittle. In sum, the cooler temperature has the effect of rendering laminate elements, such as semi-rigid sheet 20, more amenable to lamination and encapsulation.

Once assembled, the laminate assembly is then clamped or held by known methods and enclosed, at least along its edges, in a sealed space or peripheral vacuum chamber as are known in the art. Such enclosure is in preparation for degassing. Vacuum bags as described by Rieser et al, U.S. Pat. No. 3,808,077 or peripheral vacuum chambers such as those shown by Shumaker, U.S. Pat. No. 3,933,552 provide suitable sealed spaces communicating with the spaces between surfaces of the laminate elements.

As seen in FIG. 3, the assembly of laminate elements is degassed by evacuating sealed space 32 by conventional means such as mechanical pumps 30. Evacuation of the assembly prevents the formation or retention of air bubbles and draws moisture from between the laminate elements. Evacuation of sealed space 32 further encourages the laminate elements to lie flat in a layered relationship. It has been found that the longer the assembly is maintained under vacuum, the better are the results obtained. It is noted, however, that while the steps of pre-cooling and assembling at lowered temperatures, and degassing both improve the optical clarity of resulting laminae, the step of assembling at lower temperatures falls in the category of preventative measures, whereas the step of degassing falls more in the category of corrective measures.

Once assembly at lower temperatures is completed and the step of degassing has begun, degassing is maintained for a length of time which depends on the shape, size and configuration of the laminate assembly. To determine the degassing time, a test may be run with periodic visual inspection of the laminate assembly during degassing to verify the absence of air pockets or gaps therein. After such initial test runs, the degassing time can be determined for each particular type of laminate assembly tested.

After degassing, the laminate assembly may be heated, preferably while still under vacuum, by known means, such as placing the laminate assembly in a heated chamber. The length of time for heating depends on the size of the laminate assembly and characteristics of the heated chamber. To determine this heating time, a test may be run with periodic visual inspection of the laminate assembly to determine when the laminating material has melted sufficiently to hold or tack the laminate assembly together. The laminate assembly need not be perfectly clear nor the laminating material completely melted at this point. Typically, a laminate assembly may be maintained for 30 to 45 minutes in a chamber heated from 250° F. to 360° F., and emerge at a temperature in the general range of 150° F. Again, however, the heating time varies with the particular laminate assembly and may be determined in each case by trial runs.

Thereafter, in accordance with the preferred method the laminate assembly may be removed from vacuum for application of additional heat and laminating pressure to bond the laminate elements. Desirable temperature and pressures may be obtained by means known in the art such as autoclaves. Although not preferred, pressure may alternatively be applied by other mechanical means known in the art. Preferably, this latter step in the bonding process occurs at a pressure of generally 100 psig to 200 psig and at a temperature of from approximately 270° F. to 300° F. over a period from 45 minutes to two hours.

Sealed space 32 is, preferably maintained under vacuum during initial application of bonding temperatures in order to continue to draw off moisture and air. A shut off valve 34 or continued pumping with mechanical pump 30 can be used to seal or maintain the vacuum in sealed space 32. Alternatively, methods of increasing the pressure in sealed space 32 to prevent flow of thermoplastic laminating material as taught by Rase, U.S. Pat. No. 4,647,327 may be used.

The preferred thermoplastic laminating material for practicing the present invention is polyvinyl butyral. However, other thermoplastic laminating materials such as polyvinyl acetal or polyvinyl chloride may permit use of other heating means such as dielectric RF heating or ultrasound energy in connection with the application of known pressure means to bond the laminate elements. In addition, it is possible to add coatings, electrical connections and the like between layers 14 and 24 as well as between layers 12 and 14, 24, and 22, and, when used, spacers 18 and layers 14 or 24.

Figure 4:
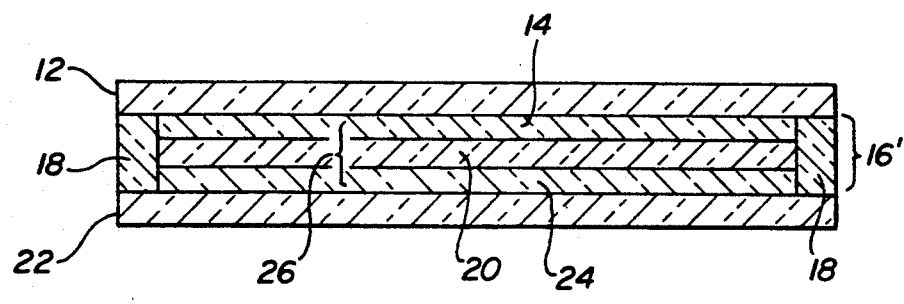
FIG. 4 is an alternative embodiment of the laminate of the present invention.

In an alternative embodiment of the invention shown in FIG. 4, laminate 10 may be comprised of first and second layers 12 and 22 of rigid transparent material, as before; and a single interlayer 16' may be comprised of an extruded multilayer sheet 26 of semi-rigid sheet material 20 sandwiched between and chemically linked to layers 14 and 24 of thermoplastic laminating materials. Single interlayer 16' may further include spacers 18 of the same thermoplastic laminating material as layers 14 and 24, which completely surround the periphery of multilayer sheet 26. The method for assembling this alternative embodiment, as before, provides for precooling the laminate elements, and positioning and assembling the laminate elements at lower temperatures. Thereafter, the laminate assembly is degassed and subjected to the bonding temperatures and pressures as described above. The laminate thus formed encapsulates the semi-rigid sheet 20 in thermoplastic material and achieves a safety laminate of similar high optical quality as enjoyed with the preferred embodiment.

Figure 5:
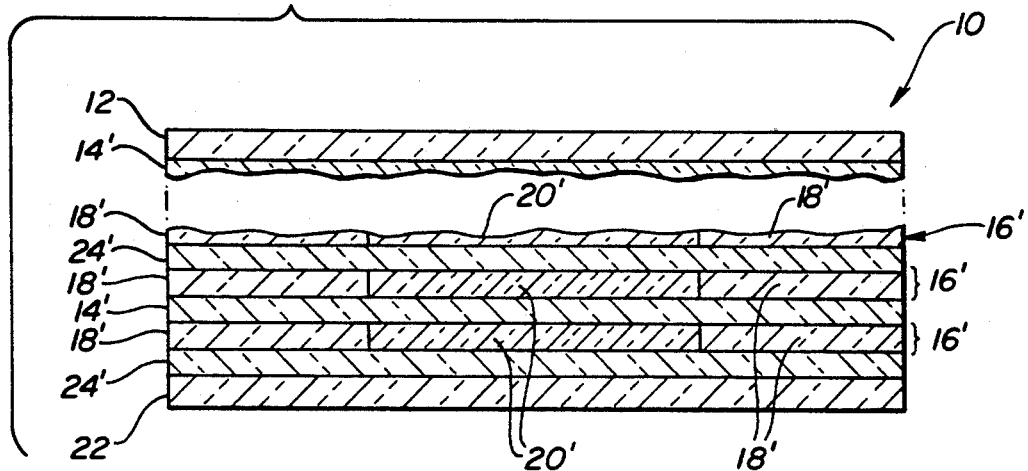
FIG. 5 is a second alternative embodiment of the laminate of the present invention.
Figure 6:
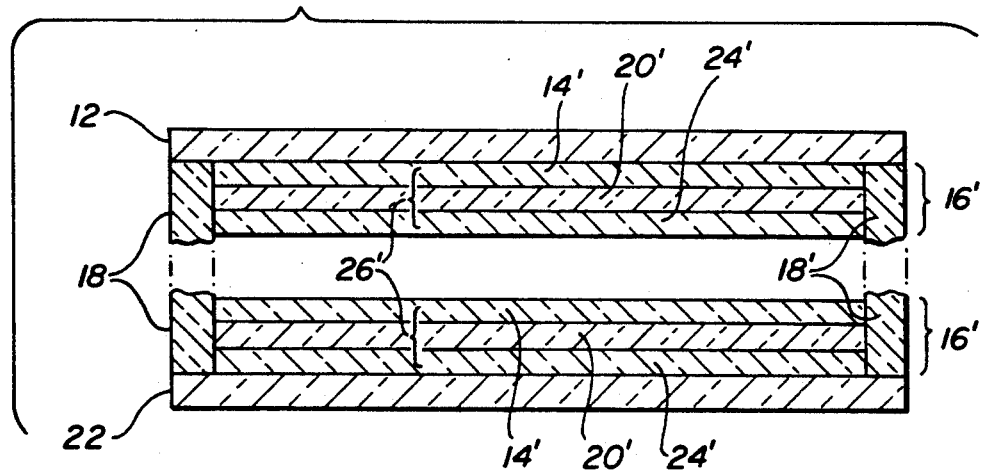
FIG. 6 is a third alternative embodiment of the present invention.

In further alternative embodiments shown in FIGS. 5 and 6, a plurality of layers of semi-rigid sheet material 20' may be alternated with and encapsulated within layers 14', 24' of thermoplastic laminating material, preferably with spacers 18' in the manners aforesaid, and positioned in a laminate assembly between rigid layers 12 and 22.

As it may be seen, the preferred laminate of the present invention has a sheet of semi-rigid material encapsulated in a thermoplastic laminating material which is sandwiched between first and second rigid transparent layers. In the preferred embodiment of FIG. 1, the thermoplastic laminating material is polyvinyl acetal, specifically polyvinyl butyral; the first and second rigid layers are comprised of glass or polycarbonates, and interlayer 16 comprises a semi-rigid sheet 20 of polyester and spacers 18 of thermoplastic laminating material, specifically, polyvinyl butyral. However, depending on the materials chosen, the semi-rigid sheet 20 in the preferred embodiment may or may not be bonded to the thermoplastic laminating material of layers 14 and 24, and spacers 18. However, by virtue of encapsulation, semi-rigid sheet 20 adds strength to the laminate assembly 10. Thus, the use of other semi-rigid materials, bondable or not, such as electroluminescent material is contemplated.

While certain representative embodiments and details have been shown and described for purposes of illustrating the invention, it will be apparent to those skilled in the art that various changes in the methods and articles disclosed herein may be made, such as including a plurality of encapsulated, semi-rigid sheets between the first and second layers of rigid transparent material or using one or more translucent or opaque layers, may be made without departing from the scope of the invention which is defined in the appended claims.

What is claimed is:

1. A method for producing a safety laminate, comprising the steps of:

first, reducing the equilibrium temperature of the laminate elements from ambient temperature, said laminate elements including:
   (a) a first rigid transparent layer;
   (b) a first layer of thermoplastic laminating material;
   (c) an interlayer, comprising a semi-rigid material said semi-rigid material capable of bending and flexing, and tending to crease and fold thereby;
   (d) a second layer of said thermoplastic laminating material;
   (e) a second rigid transparent layer; and
then, assembling said laminate elements into a laminate assembly at said reduced equilibrium temperature, with said interlayer positioned between said first and second layers of said thermoplastic laminating material;
enclosing at least the edges of said laminate assembly in a sealed space;
degassing said laminate assembly by reducing the pressure of said sealed space by means of evacuating air therefrom;
maintaining the reduced pressure of said sealed space for a period of time;
heating said laminate assembly and applying pressure thereto, to bond said laminate elements.

2. A method as recited in claim 1 wherein said step of reducing comprises the step of reducing said equilibrium temperature of the laminate elements to a temperature less than 70 degrees Fahrenheit.

3. A method as recited in claim 1 wherein said step of reducing said equilibrium temperature comprises the step of reducing said equilibrium temperature of the laminate elements to a temperature less than 50 degrees Fahrenheit.

4. A method as recited in claim 1 wherein said rigid transparent layers and said layer of thermoplastic laminating material are of substantially the same size and wherein said step of assembling further includes the step of:
   positioning said semi-rigid material to peripherally surround said semi-rigid material with areas wherein said first and second layers of thermoplastic laminating material may bond to encapsulate said semi-rigid material.

5. A method as recited in claim 1 wherein said rigid transparent layers and said layers of thermoplastic laminating material are of substantially the same size and said semi-rigid material is of a smaller size, and said interlayer further comprises one or more spacers of said thermoplastic material; and
   wherein said step of assembling further comprises peripherally surrounding said semi-rigid material with said spacers.

6. A method as recited in claim 1 wherein said step of enclosing comprises enclosing said entire laminate assembly in a vacuum bag.

7. A method as recited in claim 1 wherein said step of enclosing comprises enclosing said laminate assembly within a peripheral evacuation chamber disposed along the outer edges of said laminate assembly.

8. A method as recited in claim 1 wherein said step of degassing comprises reducing the pressure of said sealed space with a mechanical vacuum pump.

9. A method as recited in claim 8 wherein said step of maintaining reduced pressure in said sealed space comprises shutting a valve to isolate said sealed space from said mechanical vacuum pump.

10. A method as recited in claim 8 wherein said step of maintaining the reduced pressure in said sealed space comprises continued pumping of said sealed space with said mechanical vacuum pump.

11. A method as recited in claim 1 wherein the reduced pressure in said sealed space is maintained for a period of time, ending prior to completion of said step of heating and maintaining laminating pressure, and said method further comprising the step of:

raising said pressure in said sealed space to a pressure less than or equal to said laminating pressure, whereby the outward flow of said thermoplastic laminating material from between said first and second rigid layers is inhibited.

12. A method as recited in claim 1 wherein said step of heating said laminate assembly and maintaining laminating pressure comprises the steps of:

heating said laminate assembly for a heating period while maintaining reduced pressure of said sealed space;

returning said sealed space to ambient pressure; and applying laminating heat and pressure to said laminate assembly to bond said laminate elements.

13. A method as recited in claim 1 wherein said step of heating said laminate assembly and maintaining laminating pressure comprises the step of:

placing laminate assembly in a chamber having an elevated temperature of from generally 250° F. to generally 360° F. and ambient pressure for generally 30 minutes to generally 45 minutes, while maintaining said reduced pressure of said sealed space;

returning said sealed space to ambient pressure; and placing said laminate assembly in an autoclave at an elevated temperature level of about 270° F. to 300° F. at an elevated pressure of about 110 to 200 pounds per square inch gauge for a period of from about 45 minutes to about two hours.

14. A method as recited in claim 1 wherein said step of assembling further includes the step of slidably positioning said interlayer of semi-rigid material on the surface of at least one of said first and second layers of said thermoplastic laminating material to position said interlayer between said first and second layers of said thermoplastic laminating material.

15. A method as recited in claim 1 wherein said first and second rigid transparent layers are curved, and said step of assembling comprises assembling said laminate elements into a curved laminate assembly.

16. A method for producing a safety laminate comprising the steps of:

first, reducing the equilibrium temperature of a plurality of laminate elements to a temperature below ambient temperature, said laminate elements comprising:

(a) a first rigid transparent layer;

(b) a layer of semi-rigid material encapsulated within a layer of thermoplastic laminating material, said layer of semi-rigid material having a length and width less than said first rigid transparent layer and said semi-rigid material capable of bending and flexing, and tending to crease and fold thereby; and (c) a second rigid transparent layer having a length and width substantially equal to that of said first rigid transparent layer and then;

assembling said laminate elements into a laminate assembly at said reduced equilibrium temperature, with said rigid transparent layers being positioned on opposite sides of said layer of semi-rigid material;

enclosing at least the edges of said laminate assembly in a sealed space;

degassing said laminate assembly by reducing the pressure of said sealed space by means of evacuating air therefrom;

maintaining the reduced pressure of said sealed space for a period of time; and heating and applying pressure to said laminate assembly to bond said laminate elements.

* * * * *